United States Patent Office 3,335,500
Patented Aug. 15, 1967

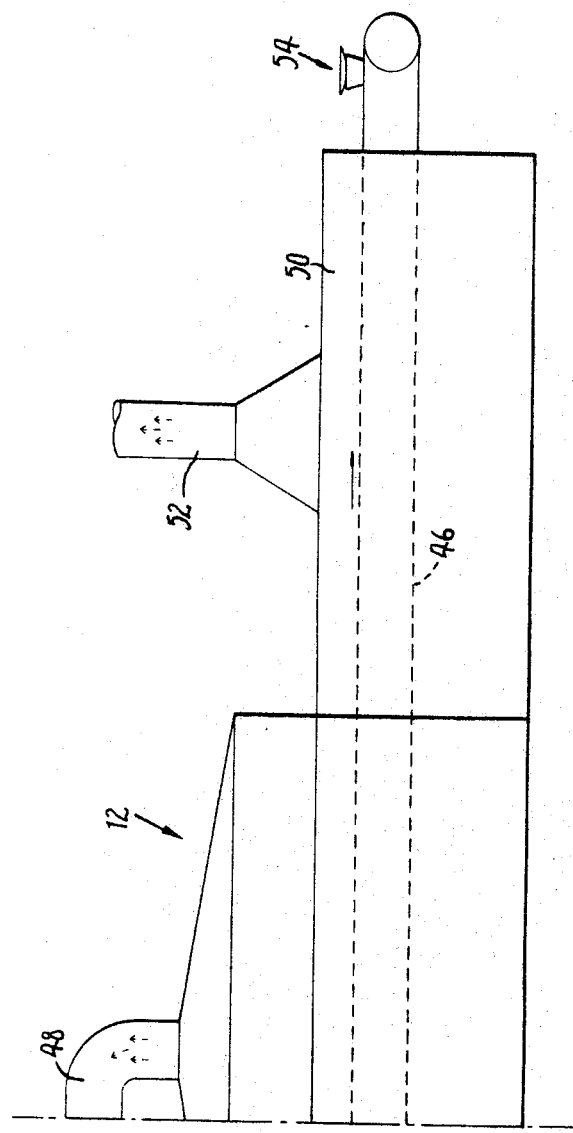

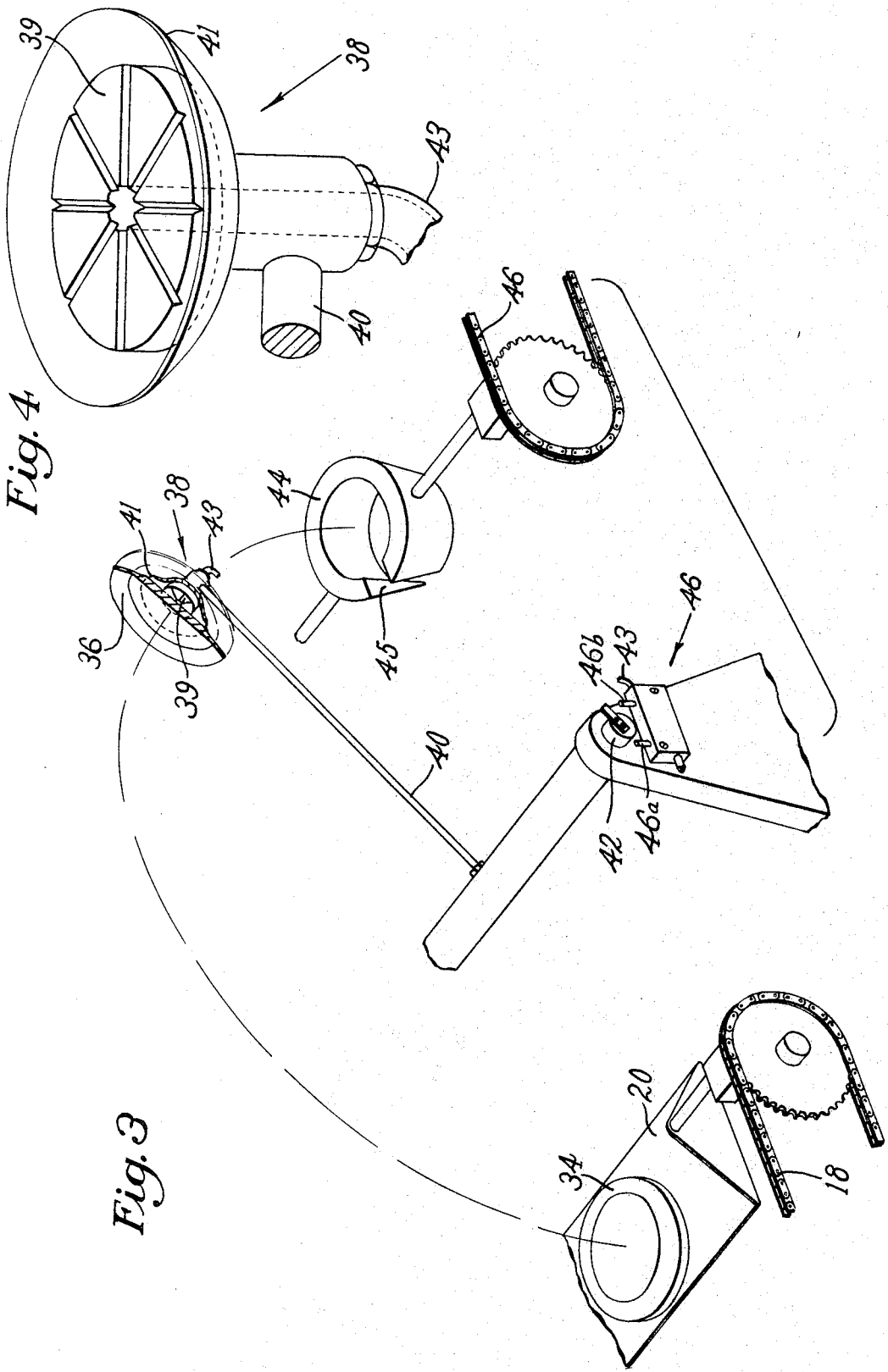

3,335,500
METHOD OF AND APPARATUS FOR
DRYING POTTERY
Arthur Dowley and Frank William Meadows, both of Stoke-on-Trent, England, assignors to Service (Engineers) Limited, Stoke-on-Trent, England, a British company
Filed Oct. 9, 1964, Ser. No. 402,844
15 Claims. (Cl. 34—21)

This invention is concerned with the manufacture of pottery, more especially a method of and machine for drying articles of ceramic ware in the manufacture thereof; the term "articles of ceramic ware" where used herein is to be understood as extending to include such articles in the course of manufacture.

It is customary, in the pottery industry, to make articles of ceramic ware from clay by forming the clay on moulds, the moisture content of the clay being in the region of 22 to 25% (on a dry basis), and subsequently to dry the articles thus formed to a moisture content of 1 to 2% (on a dry basis) by placing the articles supported on their respective moulds in a drying unit in which hot air is circulating. In order to achieve the required reduction in moisture content a drying time of 2½ to 3 hours is necessary.

Recent developments in making machines, especially in making machines of the roller-head type, have, however, greatly increased the rate of production of articles of ceramic ware and thus have given rise to the need to reduce the time necessary for drying the articles to a desired level of moisture content. In addition, it has become desirable to make the moulds on which the articles are formed more quickly available for re-use, if the number of moulds in use at any one time is not greatly to be increased.

It is an object of the present invention to provide an improved apparatus suitable for use in drying articles of ceramic ware in the manufacture thereof whereby a high rate of output of articles may be maintained with a moderate supply of moulds.

There is hereinafter described, to illustrate the invention by way of example in its apparatus aspects, and apparatus for use in drying articles of ceramic ware in the manufacture thereof, this illustrative apparatus comprising two drying units constituted by two heated chambers, in the first of which is accommodated a continuous conveyor comprising a series of pendant horizontal shelves capable of accommodating six moulds abreast. The conveyor is arranged to be moved step-by-step to carry articles supported on their respective moulds, on which they have previously been formed, through the chamber. A second conveyor is arranged to operate, in timed relation with the conveyor accommodated in the first chamber, in the second chamber and comprises a plurality of annular supports on which articles of ceramic ware may be supported, whereby articles may be carried on the second conveyor through the second chamber of the apparatus. In the operation of the apparatus, which operation is illustrative of the invention in its drying procedure aspects, articles supported on their respective moulds, to which they tend to cling when in the wet condition, are dried sufficiently in the first chamber whereby to permit the release thereof from the moulds.

The apparatus further comprises transfer means comprising a plurality of suction devices for removing partially dried articles from their respective moulds on the first conveyor and for transferring them to the annular supports of the second conveyor, each suction device comprising a ribbed pad of a plastics material and a flexible apron of a plastics material mounted on an end portion of an arm rotatable about a horizontal, or substantially horizontal, axis, and each annular support being partially cut away whereby to allow the arm of its associated suction device to pass therethrough as an article is transferred thereto. The transfer means is also effective to invert the articles transferred thereby as aforesaid, whereby in the first chamber articles are supported underside uppermost on their respective moulds and are then inverted, during the transferring movement, so as to be supported top-side uppermost on the annular supports of the second conveyor as they are carried thereby through the second chamber. In this way, in carrying out the illustrative drying procedure, the articles are dried uniformly, or substantially so.

The apparatus also comprises a third chamber through which the second conveyor is arranged to carry articles of ceramic ware when they have been dried to the desired level of moisture content in the second chamber, the arrangement being such that articles are cooled in the third chamber whereby to render them capable of being handled.

There now follows a detailed description, to be read with reference to the accompanying drawings, of the illustrative apparatus and drying procedure. It is to be understood, however, that this apparatus and drying procedure have been selected merely by way of exemplification of the invention and not by way of limitation thereof.

Reference should now be had to the accompanying drawings in which:

FIG. 2 is a diagrammatic view in elevation showing another portion of the apparatus contiguous with that portion shown in FIG. 1;

FIG. 3 is a fragmentary perspective view, partially in section, showing details of the apparatus of FIGS. 1 and 2 taken on an enlarged scale for clarity; and FIG. 4 is a fragmentary perspective view showing elements of the apparatus of FIG. 3, taken on a further enlarged scale.

Figure 1:
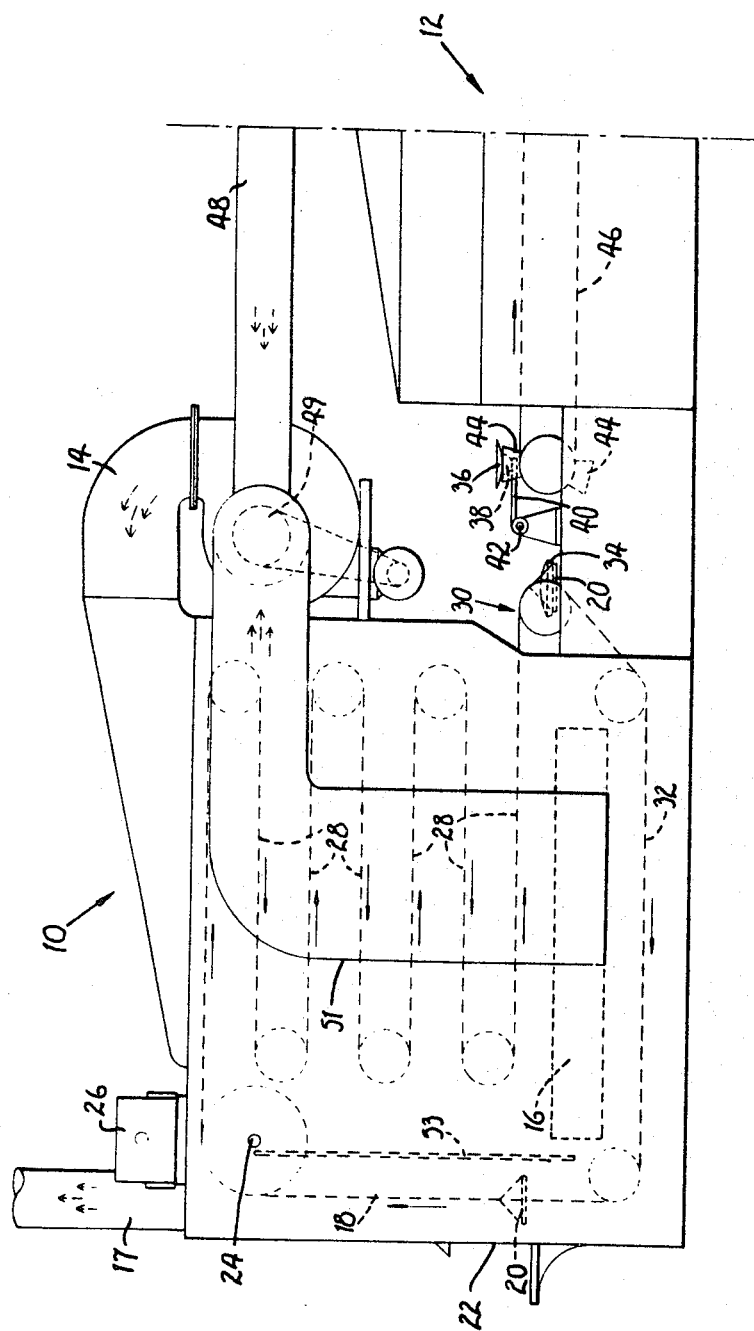
FIG. 1 is a diagrammatic view in elevation showing a portion of the illustrative apparatus.

Referring to the drawings, the illustrative apparatus comprises two drying chambers 10, 12 through which ware passes after being shaped in the manufacture of pottery. The apparatus may be equipped for flat-ware or hollow-ware manufacture, but will be described herein as set up for flat-ware which has been shaped on a making machine of a type comprising a rotatable spindle carrying a chuck and a rotatable clay-forming roller tool arranged in the operation of the machine to form a bat of clay on a mould held by the chuck. From such a machine, the operator, in carrying out the illustrative drying procedure, places the moulds with the formed clay on them in the drying chamber 10 of the apparatus. A flow of air admitted through a gas heating unit 14 at the top is maintained through this first drying chamber 10, air being withdrawn through a suction duct 16 at the bottom that leads from the chamber through an exhaust 17 at the top. A continuous conveyor 18 comprising a series of pendant horizontal shelves 20 travels upwardly past an opening 22 at a loading position of the chamber 10, over a shaft 24 driven through suitable mechanism by a motor 26. In the apparatus shown the motor 26 has an arm forming part of a Geneva mechanism arranged to engage a Geneva wheel on the drive shaft 24, thus imparting step-by-step motion to the conveyor 18. The conveyor 18 then travels backwards and forwards along horizontal paths 28 as it descends to an exit 30. From the exit 30, the conveyor follows a largely horizontal path 32 to the loading station. The shelves 20 are six-and-a-half feet long and thus capable of accommodating six moulds 34 (one only shown) abreast in carrying out the drying procedure. The conveyor 18 is driven step-by-step when the apparatus is in use and is so constructed and arranged that at each rest period of its movement one shelf 20 is at the loading station while another is at the exit 30, all the shelves coming to rest in the same positions when they reach their respective localities. The pauses between the steps of the conveyor 18 are sufficient for the operator of the making machine to place the moulds 34 in position on the shelves 20. The conveyor takes sufficiently long to carry the moulds to the exit 30 that by the time they reach there, six abreast, the formed clay ware 36 is ready for release from the moulds. In the case of flat-ware formed from plastic clay with an uncombined water content of, say 25% (on a dry basis), the passage through this first drying chamber is so arranged that release usually takes place in 20 minutes, air being introduced at a suitable humidity and at a temperature not exceeding 200 F.

At the exit 30 of the first drying chamber 10 of the apparatus, the ware is transferred from the moulds 34 to the second drying chamber, the ware being inverted during transfer. For thus transferring the ware, the apparatus comprises transfer means comprising six suction devices 38 (one only visible in the drawing) carried by arms 40 mounted on a horizontal rotatable shaft 42 extending widthwise between the drying chambers 10 and 12 and arranged to swing from first positions in which they overlie the six moulds which lie abreast, underside uppermost, at the exit of the first drying chamber during a pause between the steps of the conveyor 18 on which they are carried, over the shaft to second positions (as shown in the drawing) in which they can deposit the ware, top-side uppermost, on annular supports 44 of a second, chain-type, conveyor 46 of the second drying chamber 12 driven in timed relation with the conveyor 18. Each annular support 44 has an opening 45 facing the transfer means so that the arm 40 can pass through the support as the suction devices come down to their second positions. Each suction device 38 comprises a pad of a plastics material 39 ribbed to engage the ware while yet allowing freedom for withdrawal of air between the pad 39 and the ware, and a flexible apron 41 of a plastics material surrounding the ribbed pad that forms an airtight sealing ring with the surface of the ware. After depositing the ware 36 on the supports 44 of the second conveyor 46 and after the supports have moved away the arms 40 swing back to a rest position between their first and second positions.

The suction devices 38 of the transfer mechanism of the apparatus are connected to a vacuum line 43 through valve means 46 having plunger 46a and 46b arranged to apply the vacuum when the devices have been brought down on to the ware 36 on the moulds 34 and to release the vacuum when the suction devices have reached their second positions and laid the ware 36 on the annular supports 44 of the second conveyor 46.

After the ware has been removed from the moulds 38 carried by the conveyor 18 of the first drying chamber 10, the moulds continue to be carried on the conveyor along the path 32 to the loading station at which they are available to the operator of the making machine.

The second drying chamber 12 of the apparatus is of any convenient kind, preferably of a type in which infra-red heaters face downwardly on to the ware. Heaters placed above the ware have been found satisfactory to dry the ware to, say, 2% moisture, in 5–10 minutes taken by the ware to pass through the chamber. Warm air from this chamber 12 may conveniently be passed to the first chamber 10 through a duct 48 and fan 49. The fan 49 also draws some air through a duct 51 from the duct 16 for recirculation through the first drying chamber. A baffle 53 restricts escape of air from the first drying chamber through the opening 22.

A third chamber 50 through which air passes to an exhaust duct 52 and through which the ware 38 takes 5 minutes to pass on the conveyor 46 is preferably provided as shown in the drawing to allow the ware to cool to a temperature at which it can be comfortably handled. The ware 38 is then, in carrying out the drying procedure, removed from the second conveyor at an unloading station 54.

By means of the apparatus, ware can be dried in a shorter time than is at present customary in the potteries where the ware remains on the moulds while they pass slowly through drying chambers, and, by virtue of the moulds being released from their ware-supporting function at an early stage in the drying process, the moulds can be returned to the locality of the making machine after only a short further time on the first conveyor. The number of moulds required to maintain a high output of ware is thus kept to a minimum.

Having thus described our invention, what we claim as new and desire to secure by Letters Patent of the United States is:

1. A method of drying articles of ceramic ware in the manufacture thereof comprising the steps of passing moulds with articles of ceramic ware formed thereon through a first heated chamber for a predetermined time to reduce the moisture content of the articles sufficiently to allow them to be released from the moulds, removing the articles from the moulds and transferring them to a second heated chamber, during which transferring step the articles are inverted, and passing the articles through the second chamber to reduce the moisture content of the articles to a desired level.

2. A method according to claim 1, wherein said step of removing the articles from the molds and transferring them to a second heated chamber is carried out substantially at that point in said first chamber where said articles have been dried to the mold release condition.

3. In an apparatus for use in drying articles of ceramic ware in the manufacture thereof, transfer means for transferring articles of ceramic ware from a first heated chamber to a second heated chamber, said means comprising an arm mounted to swing about an axis extending transversely of the heated chambers and supporting a suction device, means for swinging the arm from a first position, in which the suction device engages with an article in the first heated chamber, to a second position, in which the article is deposited in inverted position in the second heated chamber, the article being caused to be inverted during the transfer thereof, and means, arranged to operate in timed relation with the last-mentioned means, for applying a vacuum to the suction device when the arm is in its first position and is released after the arm has been swung to its second position.

4. Apparatus according to claim 3 wherein each suction device comprises a ribbed pad of a plastics material arranged to engage with the surface of an article to be transferred and a flexible apron of a plastics material surrounding the ribbed pad and arranged to form a seal with the surface of the article to be transferred.

5. Apparatus for use in drying articles of ceramic ware in the manufacture thereof comprising a first drying chamber, a first conveyor accommodated within the first chamber and provided with means for supporting molds on which articles of ceramic ware have been formed, heating means arranged within said first chamber for drying articles passing therethrough supported on the first conveyor sufficiently to permit release thereof from the molds, a second chamber, a second conveyor accommodated within the second chamber and provided with means for supporting in inverted condition articles of ceramic ware transferred thereto, heating means arranged within said second chamber for completing the drying of articles passing therethrough, and transfer means disposed for removing articles from the molds on said first conveyor at substantially that location in said first chamber where the articles are dried to the mold release condition and depositing the articles in inverted position on the support means of said second conveyor.

6. Apparatus according to claim 5 wherein at least one of said heating means comprises an infrared heating source.

7. Apparatus according to claim 3 wherein said arm is mounted to swing through an arc of 180° during movement from said first position to said second position.

8. Apparatus according to claim 5 wherein the transfer means comprises a plurality of suction devices, means arranged to operate in timed relation with the transfer means for applying a vacuum to the suction devices to cause articles to be removed from their molds on the first conveyor and transferred to the second conveyor.

9. Apparatus according to claim 5 comprising means for causing said first conveyor to move step-by-step in said first chamber.

10. Apparatus according to claim 9 comprising means for easing said second conveyor to move step-by-step in said second chamber in timed relation with the movement of said first conveyor.

11. Apparatus according to claim 5 wherein said first conveyor is provided with a plurality of shelves on which molds with articles of ceramic ware formed thereon are carried through said first chamber.

12. Apparatus according to claim 5 wherein said second conveyor is provided with a plurality of annular supports on to which articles of ceramic ware are transferred, in inverted condition, by the transfer means, each annular support being provided with a cut-away portion through which part of the transfer means passes during the transfer operation.

13. Apparatus according to claim 5 wherein said first chamber is provided with a loading station constituted by an opening through which molds with articles of ceramic ware formed thereon may be placed on said first conveyor and to which molds are returned for removal from said first conveyor after the articles formed thereon have been removed therefrom by the transfer means.

14. Apparatus according to claim 5 comprising a third chamber through which a portion of said second conveyor is arranged to pass, and means for cooling articles passing therethrough to a sufficient degree to render them capable of being handled.

15. Apparatus according to claim 14 wherein the third chamber is provided with an unloading station constituted by an opening through which dried articles of ceramic ware are removed from said second conveyor.

References Cited

UNITED STATES PATENTS

| | | | |
|---|---|---|---|
| 566,996 | 9/1896 | McAdoo | 25—40 |
| 1,191,126 | 7/1916 | Keenan | 25—40 |
| 1,361,985 | 12/1920 | Hague | 25—40 |
| 1,838,277 | 12/1931 | Miller | 25—22 X |
| 2,407,321 | 9/1946 | Miller | 25—22 |
| 2,556,096 | 6/1951 | Maddock | 34—208 X |
| 2,573,217 | 10/1951 | Parmelee | 34—105 |
| 2,616,574 | 11/1952 | Johanson et al. | 214—1 X |
| 2,716,265 | 8/1955 | Webb | 25—40 |
| 2,997,186 | 8/1961 | Terez. | |
| 3,179,390 | 4/1965 | Boutigny et al. | 263—6 |

FREDERICK L. MATTESON, Jr., *Primary Examiner.*

C. R. REMKE, *Assistant Examiner.*